United States Patent [19]

Bumpus

[11] Patent Number: 5,023,019

[45] Date of Patent: Jun. 11, 1991

[54] U.V. DETECTABLE FLAME RETARDANT

[76] Inventor: Patrick D. Bumpus, P.O. Box 7305, Auburn, N.Y. 13022

[21] Appl. No.: 567,635

[22] Filed: Aug. 15, 1990

[51] Int. Cl.$^5$ .............................................. C09K 21/00
[52] U.S. Cl. .................................... 252/607; 252/608; 106/18.12; 106/18.16; 106/18.17; 106/18.22
[58] Field of Search ............................. 252/607, 608; 106/18.12, 18.16, 18.17, 18.22

[56] References Cited

U.S. PATENT DOCUMENTS

| | | | |
|---|---|---|---|
| 4,339,238 | 7/1982 | Fringeli | 8/527 |
| 4,525,513 | 6/1985 | Hochberg | 524/288 |
| 4,564,650 | 1/1986 | Hochberg | 524/288 |
| 4,737,406 | 4/1988 | Bumpus | 428/288 |
| 4,824,483 | 4/1989 | Bumpus | 106/18.12 |

Primary Examiner—Stephen J. Lechert, Jr.
Assistant Examiner—Nina Bhat
Attorney, Agent, or Firm—Wall and Roehrig

[57] ABSTRACT

A flame retardant or fire retardant preparation can be employed with fibrous material containing either cellulosic fibers, non-absorbent fibers, or blends thereof. The preparation is formed of an aqueous solution of ammonium sulfate, a metasilicate salt serving as binder, and ammonium phosphate (MAP or DAP). An ultraviolet inhibitor is preferably included in the solution. A wetting agent promotes penetration of the solution into cellulosic fibers. An ultraviolet fluorescent agent permits non-destructive testing of articles after treatment. For increased sensitivity, the preferred fluorescent agent is a substituted 2,2' disulfonic acid sodium salt.

7 Claims, No Drawings

U.V. DETECTABLE FLAME RETARDANT

BACKGROUND OF THE INVENTION

This invention relates to fire-retardant or flame retardant preparations, and also to articles treated with such preparations.

There is an increasing need in industry, in public places, and in the home for treatment of flammable articles to render them fire resistant or flame resistant. This requirement applies to industrial clothing. It also applies to international building materials such as lumber, plywood, and other decorative materials in the commercial and industrial marketplace typically associated with hospitality, educational, and health care facilities. Flame proofing or flame retardancy is now being required even for displays and the like. Flame proofing and fire proofing is also desirable, if not required, for upholstered furniture, for vehicle interiors, and for industrial gloves and outer clothing. Flame retardancy is also required in some situations for mattresses and is desirable for paper products, wall hangings, and other flammable items.

According to a recent study of the National Fire Protection Association, about two-thirds of all home, hotel, and office fires originate on decorative materials, i.e., upholstery, wall coverings, carpets and rugs, draperies, and paneling, These items are generally installed after construction is complete or nearly complete. In industrial and commercial facilities whose decorative materials are mandated to be fire resistant, problems can occur in that if materials, in fact, do meet fire codes on new constructions upon completion, there is no way to ensure or check for the continued effectiveness of the decorative material's fire retardancy during or after initial construction. Significant problems in this area of fire protection are first, the ability to ensure that the treatment has been properly applied, and second, the ability to inspect the status of the flame- or fire-retardant treatment at future dates.

Because of the decorative nature of many of these materials, it is important also that the flame-retardant or fire-retardant treatment not discolor the materials or otherwise degrade their appearance.

The conventional method of treating these articles for fire or flame retardancy is to apply an aqueous solution of an inorganic salt having fire-retardant characteristics, and then to dry the article. However, because these conventional treatments involve a soluble inorganic salt, the durability of the treatment is quite limited. This is because the salt dissolves or leaches out in moisture and can be washed away by laundering or dry cleaning, or simply by perspiration or high humidity conditions. Another problem of conventional treatments is that the inorganic salt employed as a fire-retardant can bring stiffness and/or discoloration to the treated article. Furthermore, because the inorganic salt can be somewhat toxic, the amount that can be employed for a given area of fabric is somewhat limited.

It would be desirable to supply the treatment as a self-application kit, e.g. for use by schools, parents, theater groups, etc. This would provide a safe and simple means for Such a self-application kit would, of course, facilitate the treatment in place of existing drapes, carpeting, etc., without requiring their removal and reinstallation.

Another problem with previously-proposed flame- or fire-retardant treatments is their incompatibility with synthetic, high-polymer content fiber products. This is a problem derived from the use of water soluble inorganic salts, which have little if any tendency to bond to the surface of they synthetic organic polymer fibers.

A further problem is that with a generally colorless and textureless treatment, the untreated product appears the same as the treated product. Accordingly, it would be extremely desirable to provide means to detect whether an item has been treated, or whether a previous treatment is still effective. Destructive testing, i.e., applying an open flame to the decorative materials, is unacceptable in almost all instances.

One proposed solution that has met generally with success is described in U.S. Pat. No. 4,824,483. This involves a treatment that can be applied onto previously installed materials, which can be made of high-polymer content fibers, and which is quite durable. This patent, which involves the same inventor as in this improvement, also describes additives to enhance the penetration and persistence of the treatment and to give the treatment an ultraviolet detectability.

The treatment involved in that patent is an aqueous solution of ammonium sulfate, a metasilicate salt serving as a binder, and an ammonium phosphate such as monoammonium phosphate (MAP) or diammonium phosphate (DAP). To this an ultraviolet inhibitor can be added, and the inhibitor disclosed in the patent is a substituted disulfobenzophenone, namely disodium 2,2'-dihydroxy 4,4-dimethoxy - 5,5-disulfobenzophenone, which is commercially available from BASF Wyandotte under the name UVINUL DS-49. This compound has fluorescent properties, and will fluoresce with a color ranging from orange to lime green under strong exposure to long-wavelength ultraviolet light.

With such a system, a fire inspector can field-test the treated materials non-destructively, using an ultraviolet test lamp. This also reduces the need to rely solely on written documentation of treatment, as the effectiveness of the treatment is, or should be, visible to the inspector.

In addition, a wetting agent can be included in the treatment to facilitate penetration into the fibers. In the patent, a wetting agent is disclosed that biogrades after treatment so that further wetting after application will not affect the flame retardancy.

Unfortunately, the ultraviolet agent used in the patented formulation, i.e., the substituted disulfobenzophenone, does have a drawback in that its fluorescence is quite weak. In many cases, a zero or near-zero light condition (total darkness) is required to verify the presence of the treatment. On some materials, such as wood, the visible light is very difficult to see, even under ideal conditions. Moreover, under some conditions the ultraviolet agent does not stay in solution before treatment. Even though this does not affect the fire-or flame-retardancy, it does render the treatment impossible to verify by ultraviolet means.

For these reasons, an improved formulation has been sought in which the ultraviolet agent fluoresces at a level strong enough to be detected in the presence of normal incident light, which will be detectable on all treated material, and which will reliably remain in formulation in the treatment until application.

OBJECTS AND SUMMARY OF THE INVENTION

It is an object of this invention to provide a fire- or flame-retardant treatment which avoids the drawbacks of the prior art, and which is detectable by non-destructive means.

It is a more specific object to provide a fire- or flame retardant treatment which fluoresces in the presence of long wavelength ultraviolet light so as to be visible in ambient light.

It is a more particular object of this invention to provide a fire- or flame-retardant treatment which can be applied to natural, i.e. cellulosic fiber products or to synthetic polymer fiber products, which is persistent and durable, which does not lose its flame- or fire-retardant properties if the treated article is dry cleaned, which will not wear off and will withstand numerous washings, and which does not adversely affect the texture or color of the treated article.

It is yet another object of this invention to provide a flame- or fire-retardant treatment which can be applied to carpeting, drapery, or other installed articles while in place and which can be applied to articles formed of cellulosic fibers, or high-polymer absorbent fibers, or of blends of these.

It is a further object of this invention to provide a UV-detectable flame- or fire-retardant treatment whose ultraviolet agent reliably remains in formulation until applied to the materials treated, even when the aqueous solution that comprises the flame-or fire-retardant is alkaline.

According to one aspect of this invention, a flame- or fire-retardant preparation is formed of an aqueous solution of ammonium sulfate, a metasilicate salt, such as sodium metasilicate, serving as a binder, and an ammonium phosphate, such as monoammonium phosphate (MAP) or diammonium phosphate (DAP). In one typical preferred treatment, the aqueous solution consists essentially of about 0.9 parts sodium metasilicate, about 12.0 parts ammonium sulfate, about 4.12 parts monoammonium phosphate, and sufficient water to make up 100 parts. To this an ultraviolet inhibitor is added.

The dissolved ammonium sulfate penetrates into cellulosic fibers such as cotton, wool, cellulose, etc., and the sodium metasilicate assists the bonding of the ammonium sulfate both to the cellulosic fibers and also to non-absorbent fibers, such as nylon, acetate, polyester, polypropylene, etc. Monoammonium phosphate covers and bonds to the surface of the nonabsorbent fibers, such as nylon, polypropylene or other synthetic polymers, and the presence of the sodium metasilicate facilitates this.

To increase the ability of the solution to wet cellulosic fibers, the solution also contains about one percent of a nonionic esterized branch chain alcohol ethoxylate with a phosphate base, to serve as a wetting agent. This loses its wetting properties after application, which inhibits the treatment from washing out.

For non-destructive inspection of articles for testing both whether, and how well, they have been treated, the solution includes a fluorescent agent which emits visible light of a characteristic color when illuminated with long wave ultraviolet. This can be a substituted 2,2'-disulfonic acid salt, to it, 4,4'-bis -2-diethylamine -4-(2,5-disulphophenylamino)-5-triazinyl-6-aminostil-bene-2, 2'-disulfonic acid sodium salt. This can be present in any effective amount in the range of 0.001% to 4% by weight of the solution.

These materials involved in the flame- or fire-retardant treatment are colorless and do not degrade the visible appearance of decorative materials nor do they impair the touch or texture.

The above and many other objects, features, and advantages of this invention will be more fully understood from the ensuing description of a preferred embodiment.

DETAILED DESCRIPTION OF A PREFERRED EMBODIMENT

In the preferred embodiment of this invention, the flame- or fire-retardant preparation is formed as an aqueous solution of ammonium sulfate, sodium metasilicate, and an ammonium phosphate, preferably monoammonium phosphate (MAP). The ammonium sulfate, a fire-retardant soluble inorganic salt, penetrates into the fibers of the absorbent or "cellulosic" fibrous materials, and the metasilicate salt serves as a binder for the ammonium sulfate. The MAP attaches to the non-absorbent synthetic fibers, such as polyesters, polypropylene, nylons or polyamides, acetates or polyacetates, polyolefins, polyethylenes, and the like. The metasilicate salt affects some bonding of the ammonium sulfate to the non-absorbent fibers. MAP or DAP, in the presence of elevated temperatures, serves as an oxygen-starving agent. The MAP or DAP breaks down chemically at temperatures above about 260 degrees C., and the breakdown products starve oxygen from the flammable gases that emanate from heat decomposition of the non-absorbent fibers. This has provided an effective way of preventing spread of fire and flame in synthetic polymer materials. By contrast, conventional inorganic salts that are often used for flame- or fire-retardant treatment will not prevent flame spread in these synthetic materials.

The effect of these ingredients is described in my earlier U.S. Pat. No. 4,824,483, which is incorporated herein by reference. However, instead of the substituted disulfobenzophenone employed in the composition disclosed there, in the present invention a substituted 2,2'-disulfonic acid salt is employed as a fluorescent agent, namely 4,4'-bisdiethylamino-4-(2, 5-disulfobenzophenone)-5-triazinyl-6-aminostilbene-2,2'-disulfonic acid sodium salt.

This additive permits drapes, carpets, wall coverings, upholstery and other decorative materials to be tested nondestructively using a simple long-wave ultraviolet lamp. The testing can be carried out without requiring extreme darkness. The fluorescence will be observable under most indoor ambient light conditions, although subdued lighting is preferred. With this additive, the presence of the treatment is readily visible on wood or other cellulosic fibers, whereas the visible light was extremely faint when the prior compound, i.e., substituted disulfobenzophenone, was employed as the fluorescent agent.

The preferred preparation has 0.9 parts of sodium metasilicate, 13.0 parts of ammonium sulfate, 4.12 parts of MAP, and sufficient water to make up 100 parts. These parts are by weight. This blend represent the maximum amount of the chemicals that can be dissolved in water and remain in solution. Nevertheless, there is some trade-off between the ammonium sulfate and the MAP, that is if a greater amount of one of these chemicals is desired, the solution can accommodate it by using less of the other. Current experiments seem to indicate that the two together can constitute up to about twenty percent of the solution. Accordingly, the blend of ingredients can be tailored to suit a specific fabric, if the amount and types of fibers are known. Any combination of MAP or DAP with ammonium sulfate (up to this total of about twenty percent) will have good fire retardancy, but the optimum protection seems to be with the above mentioned blend. The amount of sodium metasilicate used in this example is sufficient for adequate bonding of the ammonium sulfate. The amount of this ingredient is preferably limited to keep toxicity at a minimum and to keep alkalinity low.

An ultraviolet inhibitor, of commercial grade and quality, and which does not react with other ingredients can also be used. To increase penetration of the preparation into wood or other fibers, a biodegrading wetting agent can be employed, and one suitable agent is non-ionic esterized branch chain alcohol materials fluoresce to emit a characteristic bright blue light. This permits fire inspectors and insurance inspectors to determine if a particular installation meets fire code requirements. The effectiveness of the treatment can be quickly checked at periodic intervals.

The treatment can be applied by spraying the aqueous solution onto the material, or by dipping the material into the solution. The water is then allowed to evaporate from the sprayed or dipped material. Evaporation of the water can be accelerated by application of heat or dry air.

Due to the binding effect of the sodium metasilicate and the natural bonding characteristics of the MAP, this fire- or flame-retardant treatment has been found to be exceptionally durable and is not noticeably diminished, even by ten or more cycles of laundering or dry cleaning. The treatment is considered permanent.

The flame- or fire-retardant preparation of this invention can be applied easily, either to new or to previously installed carpeting, draperies, upholstery, wall coverings, or other decorative materials. Application can involve simple spraying onto the carpeting, draperies, or other material, and permitting the treated material to dry. Removal of existing carpeting and reinstallation of treated carpeting in unnecessary. The preparation lends itself to use in self-application kits, namely a container of the preparation, a sprayer, a sheet of simple instructions and a small, hand-held UV lamp or light gun for testing. By following the simple instructions described ethoxylate, which retains its properties over a wide range of pH.

For highly improved ultraviolet detectability, an ultraviolet fluorescent agent is included in the amount of about 0.04 weight percent. In the preferred mode, this agent is a sodium salt of a substituted 2,2'disulfonic acid, namely 4,4'-bis-2-diethylamino-4-(2,5-disulfobenzophenone)-5-triazinyl-6-amino-stilbene-2,2'-disulfonic acid, sodium salt. This compound in solid form is a light yellow powder, but when dissolved is clear. The compound has an absorption maximum at 349 nm (long-wavelength ultraviolet) and an emission fluorescence maximum at 438 nm (blue). The compound is soluble in water and retains its solubility in somewhat alkaline conditions. This compound is sometimes employed in photographic chemistry as an ultraviolet inhibitor for protection of color film. As far as can be learned, it is rarely or never used outside of that field, or where it is likely to be exposed to air and light over extended periods of time. The compound has the following formula:

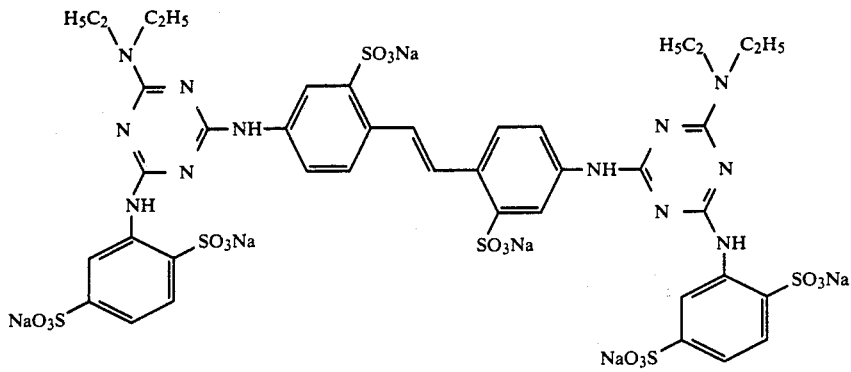

Treated materials can be tested using an ultraviolet lamp producing sufficient light at or near about 349 nm. The treated above, school custodial personnel, parents, theater groups, or others without special training can apply this fire- or flame-retardant treatment to fabrics or other fibrous products. The treatment can also be applied to display items, paper, wallpaper and building materials.

In the above embodiment, water is employed as the vehicle for the other ingredients, water being a generally safe, non-toxic carrier. However, in industrial applications where high-speed drying is important, an organic carrier can be used, or an accelerator can be added to the solution. The substitute carrier or accelerator should be inert with respect to the fibers of the materials to be treated.

The wetting agent, e.g. non-ionic esterized branch chain alcohol ethoxylate, also serves to hold the substituted 2,2'-disulfonic acid salt in solution, even in the presence of a high alkalinity from the other ingredients. This counters the tendency of disulfonic acid salts to precipitate out under high pH conditions. The ethoxylates bond the basic ingredients and the alkaline fluorescent compound to allow that compound to be accepted by the aqueous solution. Once dissolved, the substituted disulfonic acid remains in solution.

The substituted disulfonic acid, with its broader light absorption spectrum, also serves as a UV inhibitor, providing greater protection against sun fading or spotting. The ultraviolet fluorescence at detection capabilities are increased because the fluoresce is about four times stronger than the fluorescent compound employed in the previous U.S. Pat. No. 4,824,483. Also, the substituted disulfonic acid has a number of absorption peaks in both the long and short wavelength portions of the ultraviolet spectrum. These can be combined for enhanced identification characteristics.

While a particular embodiment has been described in detail hereinabove, it should be recognized that this invention is not limited to that precise embodiment, and many modifications and variations would present themselves to those skilled in the art without departure from the scope and spirit of this invention as defined in the appended claims.

What is claimed is:

1. A flame retardant or fire retardant preparation that comprises an aqueous solution of ammonium sulfate, a metasilicate salt serving as a binder, and an effective amount of a fluorescent agent which is invisible under normal visible light but is clearly visible under ultraviolet illumination, wherein said fluorescent agent is a substituted 2,2'-disulfonic acid salt.

2. The flame retardant or fire retardant of claim 1, wherein said 2,2'- disulfonic acid salt is a salt of 4,4'-bis-2-diethylamino-4-(2,5 -disulphophenylamino)-5-triazinyl-6-amino -stilbene -2,2'-disulfonic acid.

3. The flame retardant or fire retardant of claim 2 wherein said salt is a sodium salt.

4. The flame retardant or fire retardant of claim 2 further comprising a suitable amount of an ethoxylate which permits the fluorescent agent to remain in solution in said aqueous solution.

5. The flame retardant or fire retardant of claim 2 wherein said effective amount of said 2,2'-disulfonic acid salt is between 0.001% and 4% by weight.

6. The flame retardant or fire retardant of claim 5 wherein said effective amount is substantially 0.04%.

7. The flame retardant or fire retardant of claim 1 further comprising an ammonium phosphate.